(No Model.) 2 Sheets—Sheet 1.
S. N. McGAUGHEY.
COMBINED CANE AND CAMP CHAIR.
No. 280,843. Patented July 10, 1883.
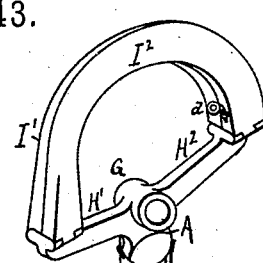
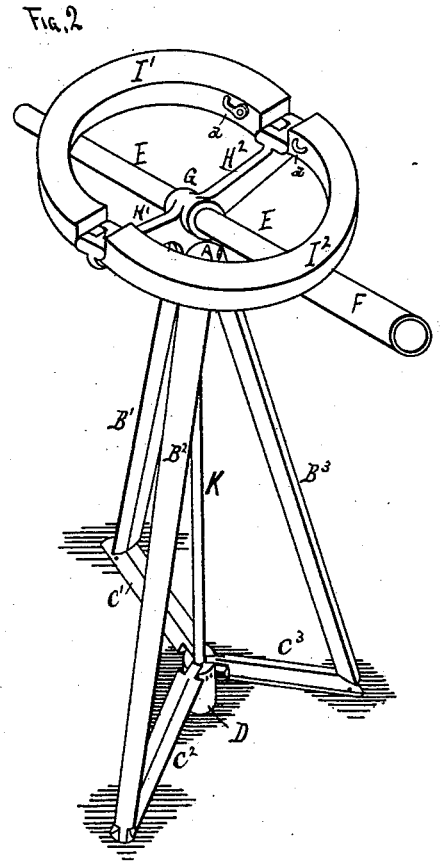
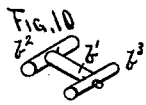
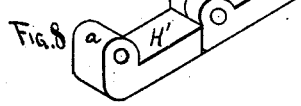
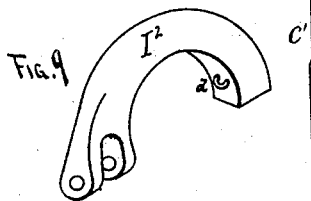
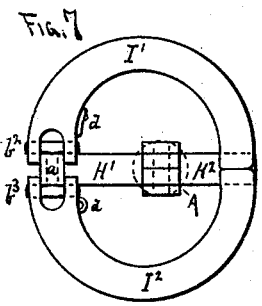
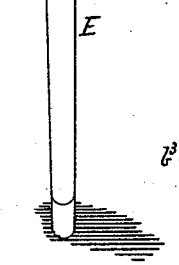
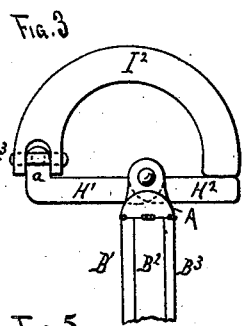
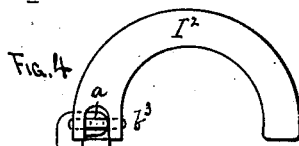
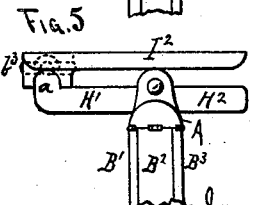
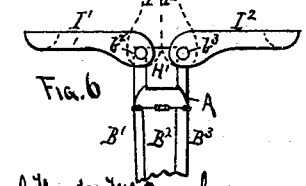
WITNESSES:
Louis Feeser Jr.
Daniel Murphy
Samuel Newton McGaughey,
INVENTOR BY
Louis Feeser &c Attys.
N. PETERS, Photo-Lithographer, Washington, D. C.

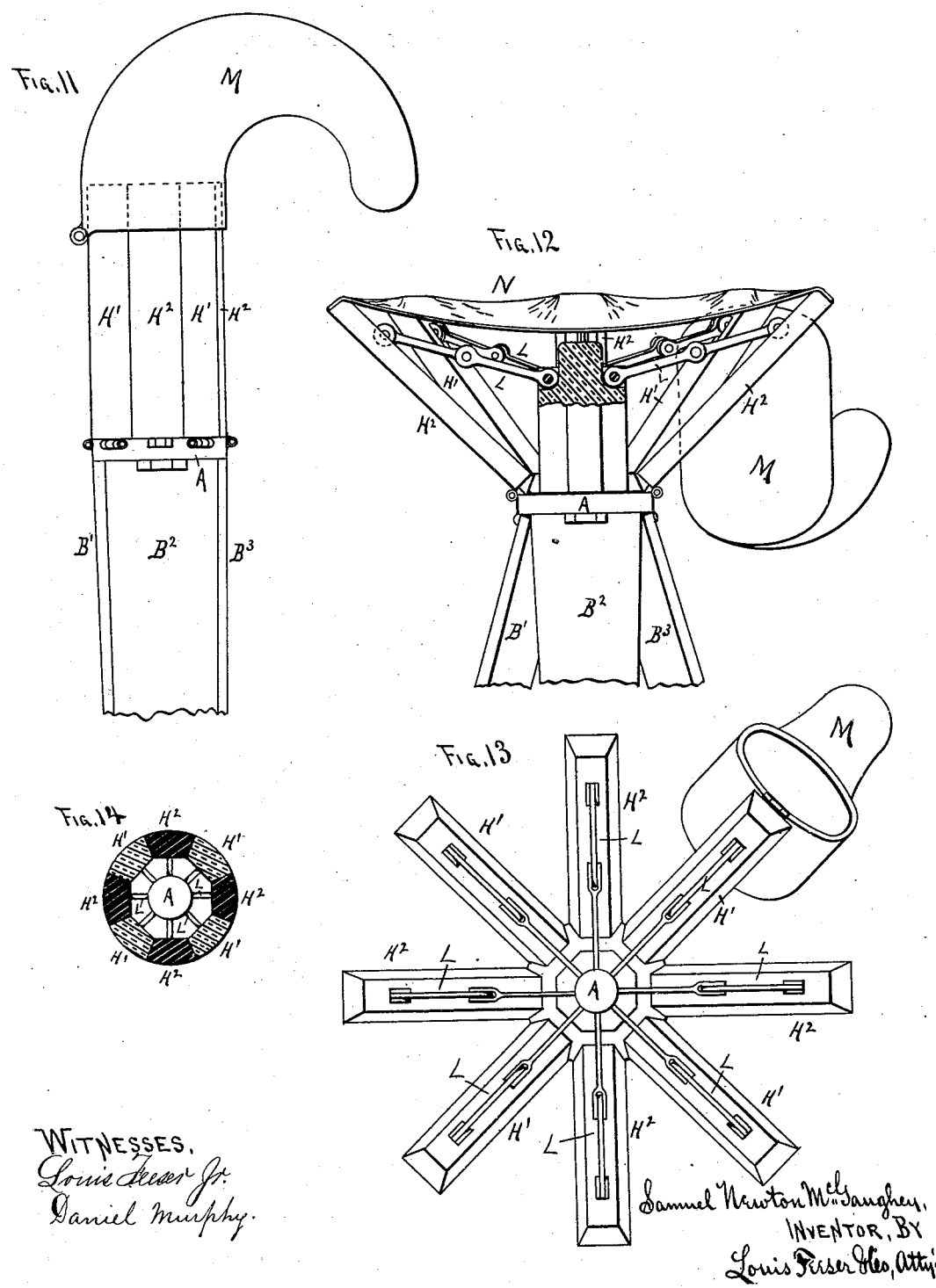

UNITED STATES PATENT OFFICE.

SAMUEL N. McGAUGHEY, OF MINNEAPOLIS, MINNESOTA.

COMBINED CANE AND CAMP-CHAIR.

SPECIFICATION forming part of Letters Patent No. 280,843, dated July 10, 1883.

Application filed December 5, 1882. (No model.)

*To all whom it may concern:*

Be it known that I, SAMUEL NEWTON MC-GAUGHEY, a citizen of the United States, and a resident of Minneapolis, in the county of Hennepin, in the State of Minnesota, have invented certain new and useful Improvements in a Combined Cane and Camp-Chair, of which the following specification is a full, clear, and exact description, reference being also had to the accompanying drawings, in which—

Figure 1 is a perspective view of the device when closed up in the form of a cane. Fig. 2 is a similar view of the same opened out in the form of a stool or seat. Figs. 3, 4, 5, 6, and 7 are detached detail views of the combined handle and seat, illustrating a slight variation in the construction. Figs. 8, 9, and 10 are disconnected perspective views of some of the parts of the form of combined handle and seat shown in Figs. 3, 4, 5, 6, and 7. Fig. 11 is an enlarged sectional view of the combined head and seat closed in a modified form. Fig. 12 is a side view of the same opened; and Fig. 13 is a plan view of Fig. 12, illustrating another variation in its construction. Fig. 14 is a cross-sectional view of the form of the combined handle and seat shown in Fig. 11.

This invention relates to a combined cane and camp-chair; and it consists in the construction and the combination of parts hereinafter particularly described, and then sought to be specifically defined by the claims.

A is a head, to the lower part of which are hinged by their upper ends three or more bars or legs, $B'$ $B^2$ $B^3$, while the lower ends of the bars are hinged into the upper ends of similar short legs or bars, $C'$ $C^2$ $C^3$. The lower ends of the legs $C'$ $C^2$ $C^3$ are hinged into a circular base-block, D, as shown. The bars $B'$ $B^2$ $B^3$ and $C'$ $C^2$ $C^3$ form segments of a tapering circular rod or staff when the bars are all drawn up together, as shown in Fig. 1, or adapted to be spread apart, as shown in Fig. 2, to form a self-supporting triangular frame.

E is a shorter staff, forming the continuation of the tapering staff above described, and provided on its upper end with a ferrule, F, adapted to fit up over the foot-block D and a portion of the bars $C'$ $C^2$ $C^3$, and thus hold the bars $C'$ $C^2$ $C^3$ and $B'$ $B^2$ $B^3$ together and prevent them from spreading apart, as shown in Fig. 1.

Upon the top of the head-block A there is a ring or socket, G, large enough to receive the continuation-piece E, as shown in Fig. 2, and branching out from either side of the socket G are supporting-arms $H'$ $H^2$, to which the ends of semicircular half-round pieces $I'$ $I^2$ are hinged, as shown. These pieces $I'$ $I^2$, when turned or folded up, as shown in Fig. 1, form a handle to the staff, and when turned down, as shown in Fig. 2, form a seat to the stool or chair.

As before stated, the pieces $I'$ $I^2$ are made half-round, with their flat sides upward when turned down, as in Fig. 2, and adjacent to each other when turned up, as shown in Fig. 1, and may be provided with suitable catches, $d$, at the rims, to hold them together when raised up to form a handle, as shown in Figs. 1 and 3.

When used as a cane or walking-stick, or when being carried from place to place, the implement will be folded up, as shown in Fig. 1, and then when a stool or seat is required it is only necessary to remove the extension-piece E and its attached ferrule F from the parts D $C'$ $C^2$ $C^3$ and insert the small end of the piece E through the socket G, release the seat-handles $I'$ $I^2$, and allow them to fall down upon the part E, which thus forms a support for them, as shown in Fig. 2, and then, by placing the center-piece D upon the ground and allowing the weight of the head-block A and the combined handle and seat to bear downward, the legs $B'$ $B^2$ $B^3$ and $C'$ $C^2$ $C^3$ will spread apart, as shown, and form bracing-legs to support the seat. The center-piece D and the joints between the legs $B'$ $B^2$ $B^3$ and $C'$ $C^2$ $C^3$ then rest upon the ground and the legs all bear an equal amount of the strain.

A metal rod, K, will be secured in the lower part of the head A and project downward inside the legs $B'$ $B^2$ $B^3$ when the staff is closed up, as shown in Fig. 1, and made just long enough to set into a socket in the upper end of the center-piece D when the staff is opened out, as shown in Fig. 2, and thus support the seat at the center and prevent the whole strain coming upon the legs $B'$ $B^2$ $B^3$, while at the same time the head-block A is stiffened and the strain removed from the hinges of the legs $B'$ $B^2$ $B^3$. This center rod, K, thus performs three important functions—bracing the head A, removing a part of the strain from the legs B' B² B³ C' C² C³, and increasing the bearing-surface upon the ground.

In Figs. 3, 4, 5, 6, 7, 8, 9, and 10 a slight variation is shown in the manner of forming the combined handle and seat, consisting in forming the supporting-arms H' H² with a rule-joint at the center in the head-block A, so that they can be folded up together, as shown in Fig. 4. The outer end of the arm H' is turned upward, as shown at $a$, and provided with a pin, $b'$, (see Fig. 10,) having cross-pins $b^2$ $b^3$ upon either end outside of the turned-up portion $a$. Upon these cross-pins, at each side of the turned-up portion $a$, are pivoted the lower ends of one side of the curved half-round seat-handles I' I², so that they are free to be folded up together, as in Figs. 1 and 3, or opened out, as shown in Figs. 2, 5, 6, and 7, and at the same time allow the parts H' H² to fold up against each other, as shown in Fig. 4, without interfering with the parts I' I². By this means a handle is formed similar to an ordinary crook-shaped cane-head, and occupies less room than when formed as shown in Figs. 1 and 2. The seat-handles I' I² are joined to the supporting-arm H', as shown in Fig. 7, so that when the seat is unfolded its ends will rest on the arms H' H², whereby the seat will be supported.

Figs. 8, 9, and 10 illustrate the construction of the parts more clearly. Suitable catches, $d$, will be arranged upon the supporting-arms H' H², to hold them locked together when folded up, as shown in Fig. 4; or one single locking device may be arranged to lock both the seat-handles I' I² and arms H' H² at the same time, if desired.

The extension E and ferrule F, when the "head" A is formed as shown in Figs. 3 and 4, may be hinged or chained to the center-piece D and lie off loosely therefrom upon the ground when the implement is used as a seat. The construction of the legs in this form is the same as in the first form, and a central supporting-rod may be provided, the same as in the first form, at K.

In Figs. 11, 12, 13, and 14 another variation in the form of the combined head and seat is shown, consisting in providing a series of the supporting-arms H' H² and hinging them by their lower ends to the head-block A, and connecting them near their upper ends to the upper part of the head-block by chains or rods L, whereby the supporting-arms may be spread out, as shown in Figs. 12 and 13, or closed up around the head-block A, as shown in Figs. 11 and 14. The outer surfaces of the arms will be segments of a circle, so that when folded up they will present an even, circular appearance, even with the remainder of the staff formed by the legs B' B² B³ C' C² C³, ferrule F, and extension E.

M is a head or cap hinged to one of the arms H' H², and adapted to fold over upon and encircle the upper ends of the arms H' H² when folded together, and hold them closed and form a handle to the staff. This handle M, when the implement is used as a seat, hangs down below the seat, as shown in Figs. 12 and 13.

A canvas top or folding seat, N, will be attached to the outer ends of the supporting-arms H' H², to form a seat for the person of the occupant when used as a seat, and adapted to fold inward out of sight when folded up. The construction of the legs in this form is the same as in the other two forms described; and a central supporting-rod may be provided, as in the other two cases. The construction of the legs being the same in all cases, they are shown only in the first and second figures of the drawings.

The strengthening-rod K may be used in all the forms shown.

The head-block A, in the form shown in Figs. 3, 4, 5, 6, 7, 8, 11, 12, 13, and 14, may be provided with a socket, G, for the reception of the extension F, if desired, the same as in Figs. 1 and 2.

Having described my invention and set forth its merits, what I claim is—

1. A combined cane and stool consisting of a series of legs hinged at their upper ends to a head-block, a base-block, a series of legs hinged at one end to the base-block and at the other end to the series of upper legs, a folding seat and supports therefor, and a ferrule for fitting over the base-block and lower hinged legs to hold the legs closed when folded up, all as shown, for the purposes set forth.

2. A combined cane and stool consisting of a series of legs hinged at their upper ends to a head-block, a base-block, a series of legs hinged at one end to the base-block and at the other end to the series of upper legs, a folding seat and folding supports therefor, means for holding the seat in its folded position, and a ferrule for fitting over the base-block and lower hinged legs to hold the legs closed when folded up, all as shown, for the purposes set forth.

3. A combined cane and stool consisting of a series of legs hinged at their upper ends to a head-block, a base-block, a series of legs hinged at one end to the base-block and at the other end to the series of upper legs, folding supports connected to the head-block, a folding seat hinged at one end to the supports, means for locking the seat when folded, and a ferrule for fitting over the base-block and lower hinged legs to hold the legs closed when folded, all as shown, for the purposes set forth.

In testimony whereof I have hereunto set my hand in the presence of two subscribing witnesses.

SAMUEL NEWTON McGAUGHEY.

Witnesses:
C. N. WOODWARD,
LOUIS FEESER, Sr.